US012755093B2

(12) United States Patent
Gurupur et al.

(10) Patent No.: US 12,755,093 B2
(45) Date of Patent: Oct. 6, 2026

(54) PREDICTING DATA INCOMPLETENESS USING A NEURAL NETWORK MODEL

(71) Applicant: University of Central Florida Research Foundation, Inc., Orlando, FL (US)

(72) Inventors: Varadraj Gurupur, Oviedo, FL (US); Muhammed Shelleh, Orlando, FL (US); Roger Azevedo, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 196 days.

(21) Appl. No.: 18/424,712

(22) Filed: Jan. 26, 2024

(65) Prior Publication Data

US 2024/0256770 A1 Aug. 1, 2024

Related U.S. Application Data

(60) Provisional application No. 63/481,606, filed on Jan. 26, 2023.

(51) Int. Cl.
*G06F 40/242* (2020.01)
*G06F 40/205* (2020.01)

(52) U.S. Cl.
CPC .......... *G06F 40/242* (2020.01); *G06F 40/205* (2020.01)

(58) Field of Classification Search
None
See application file for complete search history.

(56) References Cited

U.S. PATENT DOCUMENTS 10,158,758 B2 * 12/2018 Zimmerman ....... G10L 15/1815
11,778,098 B1 * 10/2023 Kwak ................ H04M 3/5232 379/266.01
2016/0300135 A1 * 10/2016 Moudy .................... G06N 3/08
(Continued)

OTHER PUBLICATIONS

Nasir A, Gurupur V, Liu X. A New Paradigm to Analyze Data Completeness of Patient Data. Appl Clin Inform. Aug. 3, 2016;7(3):745-64. doi: 10.4338/ACI-2016-04-RA-0063. PMID: 27484918; PMCID: PMC5052547. (Year: 2016).*
(Continued)

*Primary Examiner* — Richemond Dorvil
*Assistant Examiner* — Alexander G Marlow
(74) *Attorney, Agent, or Firm* — Onyx IP Group

(57) ABSTRACT

A prediction system may train a neural network model to analyze data to predict sentiments associated with the data and a measure of incompleteness of the data. The prediction system may obtain communication data regarding a communication session between a first device and a second device. The communication data is obtained via a network. The prediction system may provide the communication data as an input to the trained neural network model. The prediction system may determine, using the trained neural network model, a first set of sentiments associated with the first device and a second set of sentiments associated with the second device. The prediction system may determine, using the trained neural network model, a measure of incompleteness of the communication data based on the first set of sentiments and the second set of sentiments. The prediction system may perform an action based on the measure of incompleteness.

20 Claims, 9 Drawing Sheets

(56) References Cited

U.S. PATENT DOCUMENTS

| | | | | |
|---|---|---|---|---|
| 2020/0250489 A1* | 8/2020 | Zhou | ........................ | G10L 15/22 |
| 2023/0223133 A1* | 7/2023 | Aggarwal | ............... | G06F 40/35 |
| | | | | 704/9 |
| 2024/0242033 A1* | 7/2024 | Intrator | .................. | G06V 30/14 |

OTHER PUBLICATIONS

V. P. Gurupur and M. Shelleh, "Machine Learning Analysis for Data Incompleteness (MADI): Analyzing the Data Completeness of Patient Records Using a Random Variable Approach to Predict the Incompleteness of Electronic Health Records," in IEEE Access, vol. 9, doi: 10.1109/ACCESS.2021.3095240 (Year: 2021).*

V. P. Gurupur, M. Shelleh, C. Leone, D. Schupp-Omid, R. Azevedo and S. Dubey, "THNN—A Neural Network Model for Telehealth Data Incompleteness Prediction," 2023 45th Annual International Conference of the IEEE Engineering in Medicine & Biology Society , doi: 10.1109/EMBC40787.2023.10340989 (Year: 2023).*

* cited by examiner

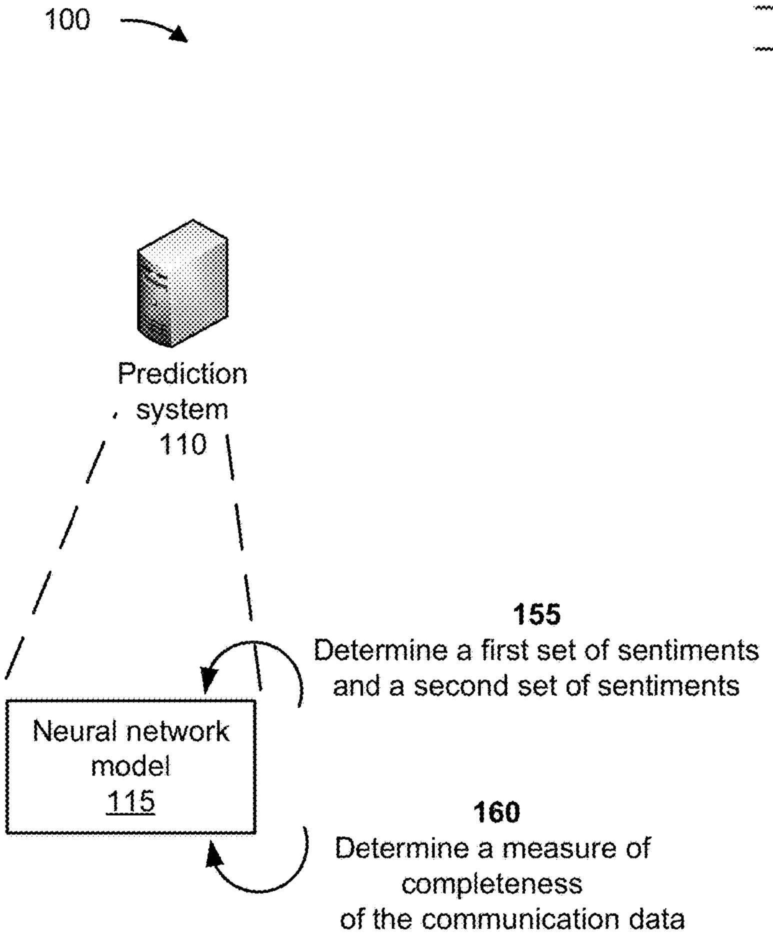

```
Algorithm 1: THNN Model
Data: Transcript Data from Telehealth System
Result: Predictions and Sentiments of Patients &
        Providers
Let n be the layers of the model;
Let X be an empty model of Neural Networks;
Let Y be the set of Identification Categories in TH;
Let Z be the set of Words in TH;
for each y in Y do
 | X.add(layer(n)(y));
end
for each z in Z do
 | X.add(layer(n)(z));
end
for each h in Y do
 | Let s_y = [i is a set instance of Identification
 |   Categories in TH — instance(i, h)];
 | for each j is s_y do
 |  | layer(n)(j) → layer(n)(h);
 | end
 | Let s_z = [z is a set instance of words in TH —
 |   ValidC(h, z)];
 | for each k is s_z do
 |  | layer(n)(k) → layer(n)(h);
 | end
 | if s_c = [l is a set instance of Identification
 |   Categories in TH — instance(n, l)] then
 |  | layer(n)(h) → LSTM;
 | end
end
return X;
```

FIG. 1E

PREDICTING DATA INCOMPLETENESS USING A NEURAL NETWORK MODEL

RELATED APPLICATION

This application claims priority to U.S. Provisional Patent Application No. 63/481,606 entitled "PREDICTING DATA INCOMPLETENESS USING A NEURAL NETWORK MODEL," filed Jan. 26, 2023, which is incorporated herein by reference in its entirety.

GOVERNMENT LICENSE RIGHTS

This invention was made with U.S. Government support under grant NSF Smart and Connected Grant, Award #6401-6A28. The U.S. Government may have certain rights in the invention.

BACKGROUND

Artificial intelligence (AI) may be used to refer to intelligence demonstrated by a machine, in contrast to natural intelligence demonstrated by humans. In the field of AI, an artificial neural network (or neural network) may be used to solve AI problems. A neural network may include one or more computing systems that include connected computing devices.

SUMMARY

In some implementations, a method performed by a prediction system includes training a neural network model to analyze data to predict sentiments associated with the data and a measure of incompleteness of the data; obtaining communication data regarding a communication session between a first device and a second device, wherein the communication data is obtained via a network; providing the communication data as an input to the trained neural network model; determining, using the trained neural network model, a first set of sentiments associated with the first device and a second set of sentiments associated with the second device; determining, using the trained neural network model, a measure of incompleteness of the communication data based on the first set of sentiments and the second set of sentiments; and performing an action based on the measure of incompleteness of the communication data.

In some implementations, a device includes one or more memories; and one or more processors, coupled to the one or more memories, configured to: train a machine learning model to analyze data to predict sentiments associated with the data and a measure of incompleteness of the data; obtain communication data generated during a communication session between a first device and a second device, wherein the communication data is obtained via a network; provide the communication data as an input to the trained machine learning model; determine, using the trained machine learning model, a first set of sentiments associated with the first device and a second set of sentiments associated with the second device; determine, using the trained machine learning model, a measure of incompleteness of the communication data based on the first set of sentiments and the second set of sentiments; and perform an action based on the measure of incompleteness of the communication data.

In some implementations, a non-transitory computer-readable medium storing a set of instructions includes one or more instructions that, when executed by one or more processors of a prediction system, cause the prediction system to: train a machine learning model to analyze data to predict sentiments associated with the data and a measure of incompleteness of the data; obtain communication data generated during a communication session between a first device and a second device, wherein the communication data is obtained via a network; provide the communication data as an input to the trained machine learning model; determine, using the trained machine learning model, a first set of sentiments associated with the first device and a second set of sentiments associated with the second device; determine, using the trained machine learning model, a measure of incompleteness of the communication data based on the first set of sentiments and the second set of sentiments; and perform an action based on the measure of incompleteness of the communication data.

BRIEF DESCRIPTION OF THE DRAWINGS

FIGS. 1A-1F are diagrams of an example associated with predicting data incompleteness using a neural network model.

FIG. 1A is a diagram of an example associated with predicting data incompleteness using a neural network model; FIG. 1B is a diagram of an example associated with predicting data incompleteness using a neural network model; FIG. 1C is a diagram of an example associated with predicting data incompleteness using a neural network model; FIG. 1D is a diagram of an example associated with predicting data incompleteness using a neural network model; FIG. 1E is a diagram of an example associated with predicting data incompleteness using a neural network model; FIG. 1F is a diagram of an example associated with predicting data incompleteness using a neural network model; FIG. 1G is a diagram of an example associated with predicting data incompleteness using a neural network model; FIG. 1H is a diagram of an example associated with predicting data incompleteness using a neural network model.

DETAILED DESCRIPTION

Figure 1A:
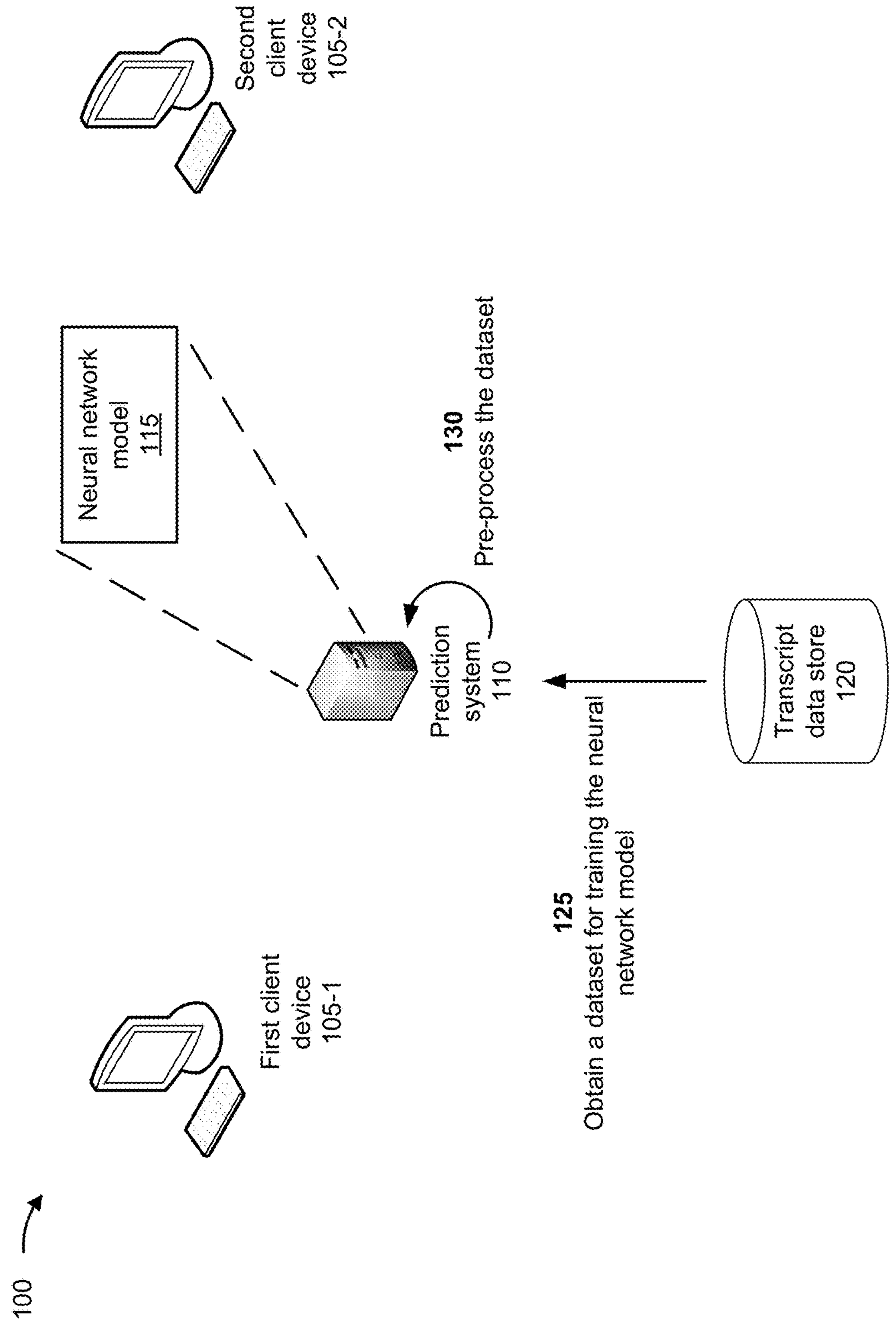

The following detailed description of example implementations refers to the accompanying drawings. The same reference numbers in different drawings may identify the same or similar elements.

A transcript (e.g., data) may be generated based on a communication session between a first device of a first user and a second device of a second user. The communication session may be a telephonic communication session, a video conferencing communication session, and/or an instant messaging communication session (e.g., chat). The transcript may be generated by the first device, the second device, and/or a third device (e.g., a server). For example, telehealth data may be generated based on a telemedicine communication session between the first device (e.g., a device of a medical professional) and the second device (e.g., a device of a patient). The first device, the second device, and/or the third device may communicate via a network.

In some situations, the transcript may not accurately reflect information exchanged during the communication session. For example, inaccurate telehealth data, that does not accurately reflect the communication session, may be generated. For instance, the telehealth data may not address one or more health conditions identified by the patient during the communication session. In the context of telemedicine, inaccurate telehealth data may prevent the patient from receiving the appropriate care.

In some situations, one or more remedial actions may be taken in an attempt to address inaccuracies in the transcript. For example, the one or more remedial actions may include reconfiguring the first device, reconfiguring the second device, reconfiguring the third device, and/or reconfiguring the network, using one or more computing devices to process the transcript, among other examples. In this regard, taking the one or more remedial actions may consume computing resources, storage resources, storage resources, among other resources.

Implementations described herein are directed to a machine learning model that is configured to predict data incompleteness of a transcript of a communication session between a first device and a second device. As used herein, "data incompleteness" may refer to lost or missing data resulting from errors due to miscommunication (between multiple users), technical limitations of a communication platform used during the communication session, and/or a fast-paced environment associated with the communication session.

For example, the machine learning model may predict data incompleteness of telehealth data based on analyzing the telehealth data to determine that international classification of diseases do not address sentiments of a patient. In some examples, data may be missing due to communications issues between the first device and the second device (or between the first user and the second user).

The machine learning model may include a neural network model. For example, the neural network model may be utilized by (or may be part of) a natural language processing (NLP) model. In this regard, the machine learning model may be a combination of NLP and neural network models. The neural network model may include a recurrent neural network model.

In some examples, the machine learning model may analyze sentiments of a first user (e.g., a patient) by way of a sentiment analysis and determine correlations between responses of the first user and a second user (e.g., a medical professional). As an example, the machine learning model may determine a causality between the data incompleteness and the sentiment analysis. The machine learning model may generate word graphs using the responses to facilitate an understanding of the correlations and the sentiments. As used herein, "medical professional" may be used to refer to a medical doctor, a nurse practitioner, a nurse, among other examples of individuals who provide medical services.

In some situations, the machine learning model may receive (as an input) data regarding the transcript and process the data. The machine learning model may generate (as an output) a measure of incompleteness of the data and sentiments of the first user and the second user. For example, the machine learning model may determine that the first user has provided information regarding a first topic and a second topic and determine that the second user has addressed the first topic but not the second topic. For instance, while the first user may identify a first medical condition and a second medical condition, the second user may provide an ICD code only identifying the first medical condition. Accordingly, the machine learning model may determine a data incompleteness regarding the data.

The machine learning model may determine a causality between the data incompleteness and the sentiment analysis. For example, the machine learning model may determine the sentiment of the second user and determine causality between the data incompleteness and the sentiment. For instance, if the machine learning model determines that the sentiment of the second user is neutral or negative, the machine learning model may determine that the second user may be experiencing fatigue, may be experiencing difficulties with focusing, and/or may be experiencing lack of empathy.

In this regard, the machine learning model may determine that the data incompleteness is a result of fatigue, the difficulties with focusing, and/or the lack of empathy. For example, a neutral sentiment or a negative sentiment of the second user may indicate a decreased aptitude to assist the first user while a positive sentiment of the second user may indicate an increased aptitude to assist the first user. The machine learning model may determine that variations in sentiment lead to variations in data incompleteness. For example, as the sentiment becomes more negative, the data may become more incomplete.

The machine learning model may be trained using training data. Training the machine learning model may include identifying one or more categories of data of the training data; identifying a dictionary for each category of the one or more categories; determining whether each identified dictionary includes a complete dataset; and determining a measure of incompleteness of each dataset of each identified dictionary. By training the machine learning model in this manner, the process for finding incomplete data becomes much faster and has higher predictability.

Based on the foregoing, implementations described herein may predict incompleteness of telehealth data, thereby enabling a patient to receive the appropriate care. Moreover, by predicting the incompleteness of the telehealth data, implementations may preserve computing resources, storage resources, and/or network resources, among other examples that would have been used to take remedial actions with respect to inaccuracies in the transcript.

In some examples, implementations described herein may provide a notification regarding the measure of incompleteness of the transcript to one or more of the first device or the second device. In some situations, implementations described herein may predict values for missing data from the transcript and provide information regarding the values to one or more of the first device or the second device. In some situations, implementations described herein may update the transcript using the values.

While the foregoing example has been described with respect to telemedicine and telehealth data, implementations described herein may be applicable to other fields utilizing transcripts of communication sessions, such as call centers, among other examples.

FIGS. 1A-IF are diagrams of an example 100 associated with predicting data incompleteness using a neural network model. As shown in FIGS. 1A-1F, example 100 includes a first client device 105-1, a second client device 105-2, a prediction system 110, and a transcript data store 120.

A first client device 105-1 may include one or more devices capable of receiving, generating, storing, processing, and/or providing information relating to predicting data incompleteness using a neural network model. First client device 105-1 may include a communication device and a computing device. For example, first client device 105-1 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device.

A second client device 105-2 may include one or more devices capable of receiving, generating, storing, processing, and/or providing information relating to predicting data incompleteness using a neural network model. Second client device 105-2 may include a communication device and a computing device. For example, second client device 105-2 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device.

Prediction system 110 may include one or more devices capable of receiving, generating, storing, processing, and/or providing information relating to predicting data incompleteness using a neural network model. Prediction system 110 may include a communication device and a computing device. Prediction system 110 may include a server, such as an application server, a client server, a web server, a database server, a host server, a proxy server, a virtual server (e.g., executing on computing hardware), or a server in a cloud computing system.

In some implementations, prediction system 110 may include a machine learning model, such as a neural network model 115. In some implementations, neural network model 115 may include a recurrent neural network (RNN) model. As an example, neural network model 115 may include a long short-term memory (LSTM). In some instances, the RNN model may be utilized by (or may be part of) an NLP model. In this regard, neural network model 115 may be a combination of NLP and one or more neural network models. As explained herein, neural network model 115 may be trained to a measure of incompleteness of the data and to determine sentiments of a first user and a second user (e.g., sentiments of a first individual and a second individual).

Transcript data store 120 may include a database or the like in a data structure, e.g., a table, and/or a linked list or the like, that stores communication data of communication sessions between client devices. For example, the communication data may include transcripts regarding the communication sessions. In some situations, the communication data may include telehealth data, such as transcripts from telehealth sessions (e.g., between patients and medical professionals).

As shown in FIG. 1A, and by reference number 125, prediction system 110 may obtain a dataset for training the neural network model. In some implementations, prediction system 110 may obtain the dataset from transcript data store 120. As an example, the dataset may include multiple unique conversations and multiple sentences or lines.

As shown in FIG. 1A, and by reference number 130, prediction system 110 may pre-process the dataset. In some implementations, when pre-processing the dataset, prediction system 110 may process the dataset to remove any missing or misidentified identifiers and remove portions of the dataset associated with the missing or misidentified identifiers. For example, with respect to telehealth data, prediction system 110 may process the dataset to remove one or more international classification of diseases (ICD) codes.

In some implementations, when pre-processing the dataset, prediction system 110 may separate the dataset into training data and testing data. The training data may be used to train neural network model 115 and the testing data may be used to evaluate an output of neural network model 115. For example, the trained data may be used to train neural network model 115 to determine sentiments and the testing data may be used to determine the accuracy of the sentiments determined (e.g., by analysis).

Additionally, or alternatively, when pre-processing the dataset, prediction system 110 may separate the dataset into text and ICD codes. For example, the training data may be separated into text and ICD codes and the testing data may be separated into text (textual data) and ICD codes. Prediction system 110 may further separate the dataset into text (textual data) and graphical data, such as emojis. For example, the training data may be separated into text, ICD codes, and emojis. The testing data may be separated in a similar manner. In some implementations, data of the dataset may be concatenated and combined. The dataset may be parsed for phrases for sentiment analysis.

Figure 1B:
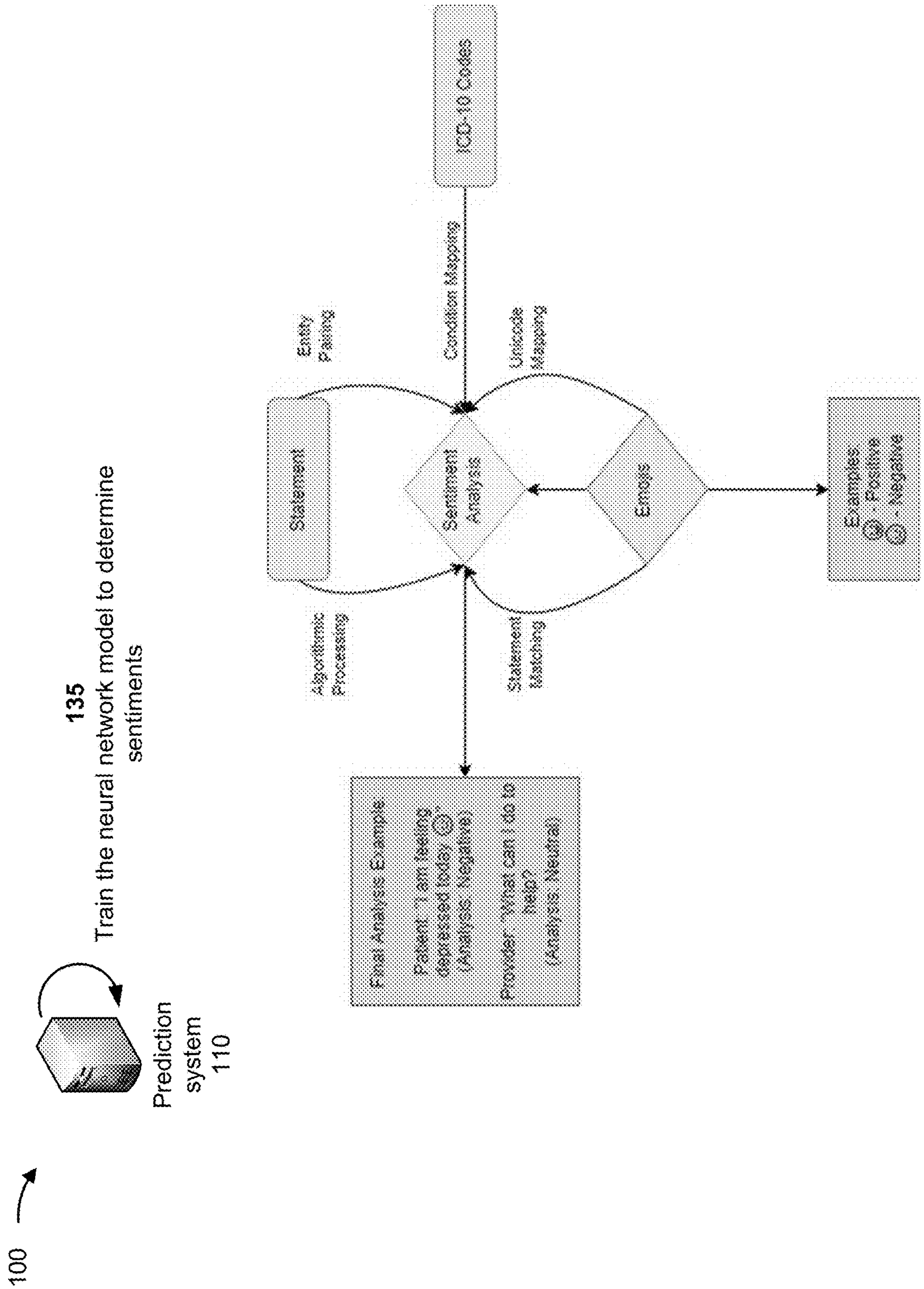

As shown in FIG. 1B, and by reference number 135, prediction system 110 may train the neural network model to determine sentiments. In some implementations, prediction system 110 may train neural network model 115 to determine sentiments using the training data. For example, prediction system 110 may train neural network model 115 using the textual data and the graphical data of the training data described above. Prediction system 110 may be trained to determine sentiments associated with the textual data and sentiments associated with the graphical data.

In some examples, neural network model 115 may include an NLP model and the NLP model may be trained to perform a sentiment analysis. When trained to perform the sentiment analysis, neural network model 115 (e.g., the NLP model) may be trained to determine if the emotional tone of a statement (made by a patient or by a medical profession) is positive, negative, or neutral. As an example of training, a statement may be obtained from the training data, an entity pairing step may be performed to pair (or match) the statement with an entity (e.g., a patient or a medical profession), and an algorithm processing may be performed to determine whether the statement is positive, negative, or neutral.

In some implementations, the graphical data (of the training data) may be processed to determine sentiments associated with the graphical data. As an example, manual mapping of emojis to sentiments may be performed. In some situations, an emoji may be mapped by a Unicode character and the emoji may be manually identified as positive, negative, or neutral. Neural network model 115 may be trained to perform a sentiment analysis on emojis based on the mapping.

In some situations, prediction system 110 may determine a medical condition associated with an ICD code. Neural network model 115 may be trained to determine whether the medical condition matches a medical condition identified or alluded to in a statement by a patient.

In some implementations, one or more dictionaries may be created and used to keep track of all the phrases used by patients and by medical professionals. For example, a first dictionary may be created for words associated with a positive sentiment, a second dictionary may be created for words associated with a neutral sentiment, a third dictionary may be created for words associated with a negative sentiment. In some situations, the above mentioned dictionaries may split into a dictionary for words of patients and a dictionary for words of medical professionals. In some implementations, the training dataset may be included into two separate dictionaries—one for sentiment analysis and one for each phrase or statement.

After training neural network model 115, neural network model 115 may be evaluated. For example, a sentiment analysis, utilizing NLP matching and testing to determine whether sentiments of patients were properly determined and whether sentiments of medical professionals were properly determined.

Figure 1C:
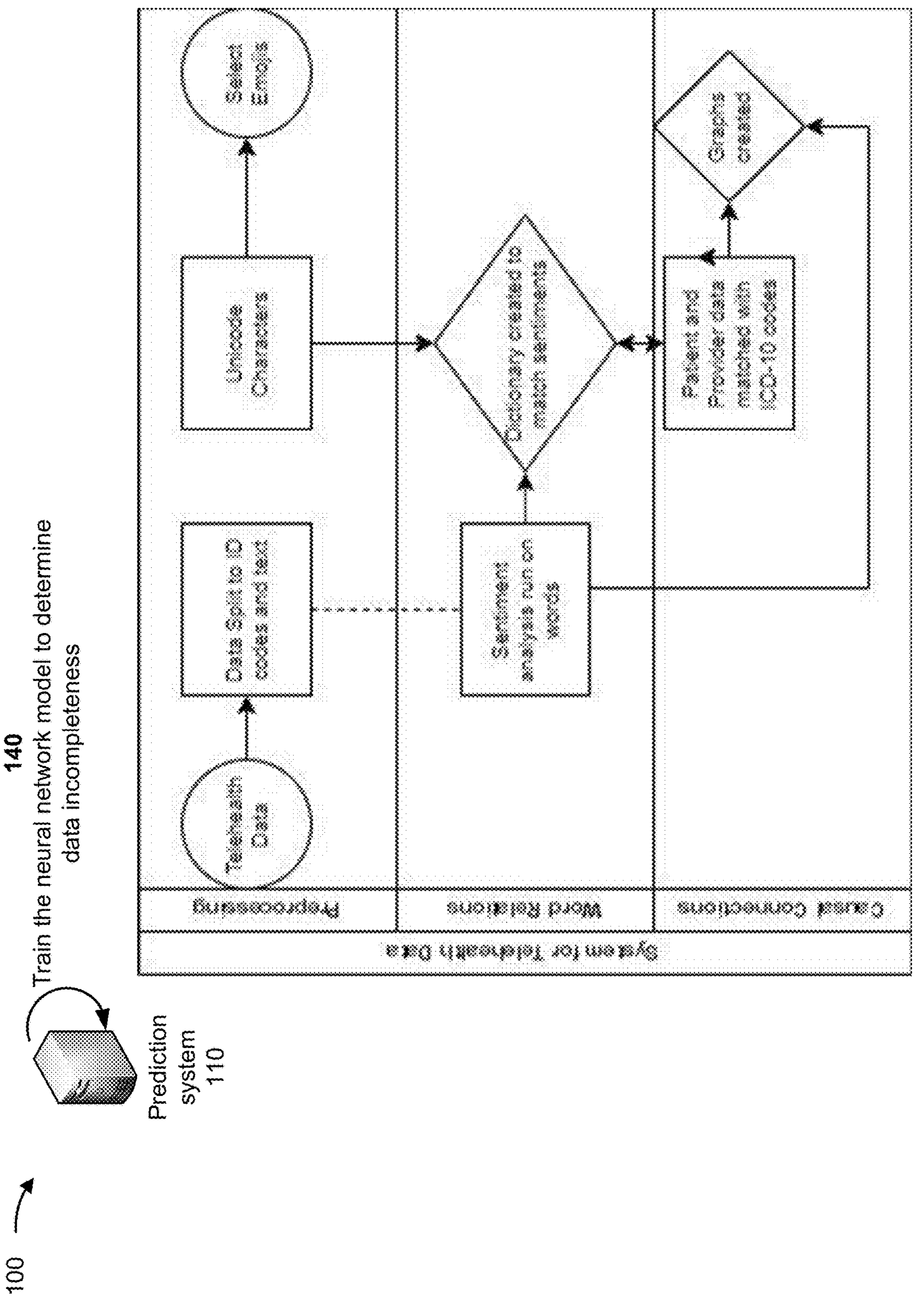

As shown in FIG. 1C, and by reference number 140, prediction system 110 may train the neural network model to determine data incompleteness. In some implementations, prediction system 110 may train neural network model 115 to determine data incompleteness. Each telehealth system includes several different categories and dictionaries of words where information is stored, where the output in categories depends on the input from the dictionaries, and each category has multiple dictionaries. These dictionaries contain a hierarchy of how they are stored, and their respective data. Weights may be determined for all of the data in each of the dictionaries, including occurrences and datatypes.

Dependencies are measured in occurrences (e.g., occurrence of one word with another word). IC identifies identification categories, and sentiments identifies sentiment completeness and availability of data in the dictionaries identified by the algorithm. Words represent the data measured for each data point in the telehealth system.

In some implementations, prediction system 110 may train neural network model 115 to determine data incompleteness by identifying the categories of a telehealth system and subsequent hierarchical dependencies (instances(category0, category1)), identifying the dictionary of each indexed category (IC(category0, dictionary1)), identifying whether the dictionaries have complete datasets (sentiments (dictionary0, data1)), and identifying the completeness of the dataset in the dictionaries (words(data0, data1)).

In some implementations, information provided by patients may be matched with ICD codes. For example, medical conditions identified by patients may be matched with ICD codes identifying the medical conditions. Additionally, information provided by medical professionals may be matched with ICD codes in a similar manner.

In some implementations, one or more word graphs may be created. Words and/or emojis (included in the training data) may be taken into consideration when the graphs and connections are created. In some implementations, neural network model 115 may be trained to generate directed word graph based on the sentiments and matches between patients and providers.

After training neural network model 115, neural network model 115 may be evaluated. For example, a sentiment analysis, utilizing NLP matching and testing to determine whether sentiments of patients were properly determined and whether sentiments of medical professionals were properly determined.

In some examples, prediction system 110 (e.g., neural network model 115) may generate word graphs using the training data to facilitate an understanding of correlations (between responses of patients and responses of medical professionals) and sentiments (of patients and of medical professionals), as explained herein.

Figure 1D:
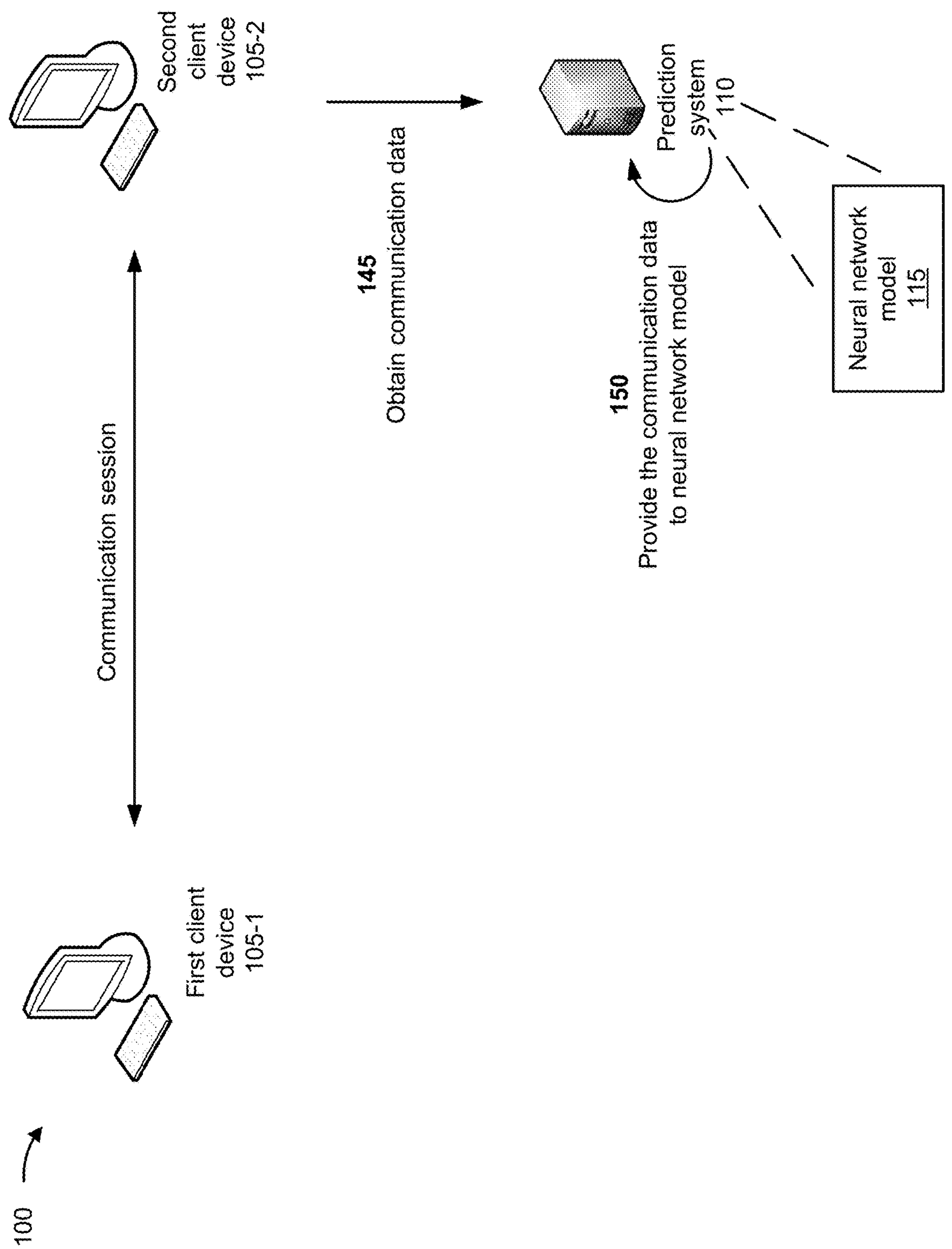

As shown in FIG. 1D, first client device 105-1 and second client device 105-2 may participate in a communication session. For example, first client device 105-1 may be a device of a first user (e.g., a patient), second client device 105-2 may be a device of a second user (e.g., a medical professional), and first client device 105-1 and second client device 105-2 may participate in the communication session for the purpose of telehealth.

As shown in FIG. 1D, and by reference number 145, prediction system 110 may obtain communication data. In some implementations, the communication data may be generated based on the communication session. In some situations, the communication data may be a transcript of the communication session. The communication data may be obtained from second client device 105-2. Additionally, or alternatively, the communication data may be obtained from first client device 105-1.

As shown in FIG. 1D, and by reference number 150, prediction system 110 may provide the communication data to the neural network model. For example, after receiving the communication data, prediction system 110 may provide the communication data to neural network model 115 to determine sentiments of the users (e.g., the first user and the second user) and to determine data incompleteness of the communication data. Neural network model 115 may be generated in a manner similar to the manner illustrated in FIG. 1E.

As shown in FIG. 1E, and by reference number 155, prediction system 110 may determine a first set of sentiments and a second set of sentiments. In some implementations, neural network model 115 may be trained to determine sentiments of the first user and the second user. In this regard, based on the communication data being provided as an input, neural network model 115 may determine the first set of sentiments of the first user and the second set of sentiments of the second user. For example, neural network model 115 may perform a sentiment analysis on text and emojis provided by first client device 105-1 and perform a sentiment analysis on text and emojis provided by second client device 105-2.

As shown in FIG. 1E, and by reference number 160, prediction system 110 may determine a measure of completeness of the communication data. For example, prediction system 110 may determine whether ICD codes, included in the communication data, address the medical conditions identified by the first user.

Figure 1F:
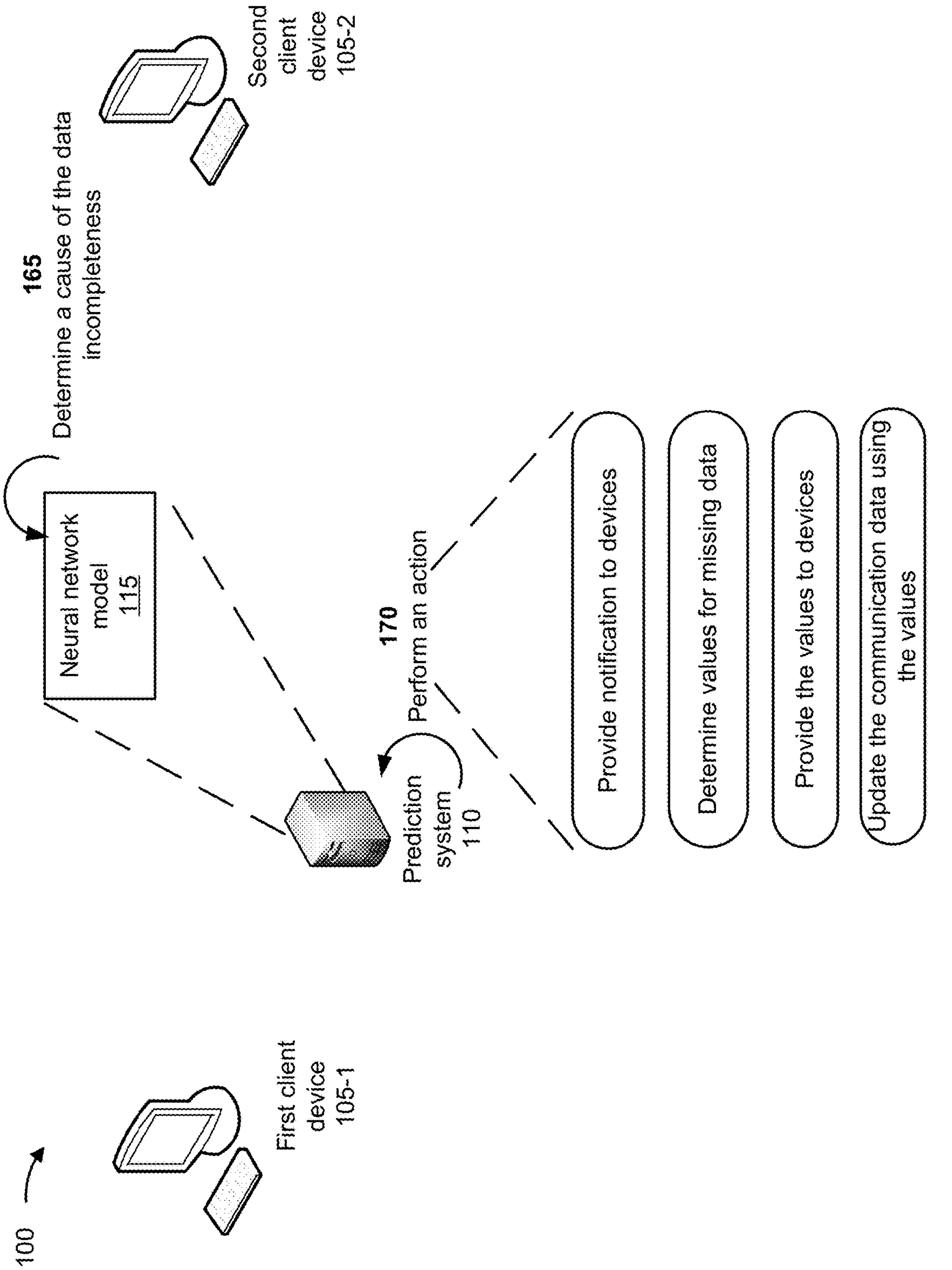

As shown in FIG. 1F, and by reference number 165, prediction system 110 may determine a cause of the data incompleteness. Neural network model 115 may be trained to determine that variations in sentiment lead to variations in data incompleteness. For example, as the sentiment (of the medical professional) becomes more negative, the data becomes more incomplete. In this regard, neural network model 115 may determine that the data incompleteness is a result of fatigue of the second user, difficulties with focusing as experienced by the second user, a lack of empathy as experienced by the second user. For example, a neutral sentiment or a negative sentiment of the second user may indicate a decreased aptitude to assist the first user while a positive sentiment of the second user may indicate an increased aptitude to assist the first user.

As shown in FIG. 1F, and by reference number 170, prediction system 110 may perform an action. In some implementations, based on the output from neural network model 115, prediction system 110 may perform action. As an example, prediction system 110 may provide a notification of the data incompleteness to first client device 105-1 and/or second client device 105-2. The notification may identify a mismatch between ICD codes and the medical conditions identified by the first user.

Additionally, or alternatively to providing the notification, prediction system 110 may determine values for missing data. For example, prediction system 110 may determine missing ICD codes corresponding to the medical conditions. Additionally, or alternatively, prediction system 110 may provide the values to first client device 105-1 and/or second client device 105-2. Additionally, or alternatively, prediction system 110 may update the communication data to include the values.

As explained herein, neural network model 115 may be trained to determine a measure of incompleteness of the data and to determine sentiments of users. Neural network model 115 may properly predict when a sentiment is left incomplete or is incorrectly responded to and what tends to be the most incomplete within a set of conversations.

As indicated above, FIGS. 1A-1F are provided as an example. Other examples may differ from what is described with regard to FIGS. 1A-1F. The number and arrangement of devices shown in FIGS. 1A-IF are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-IF may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
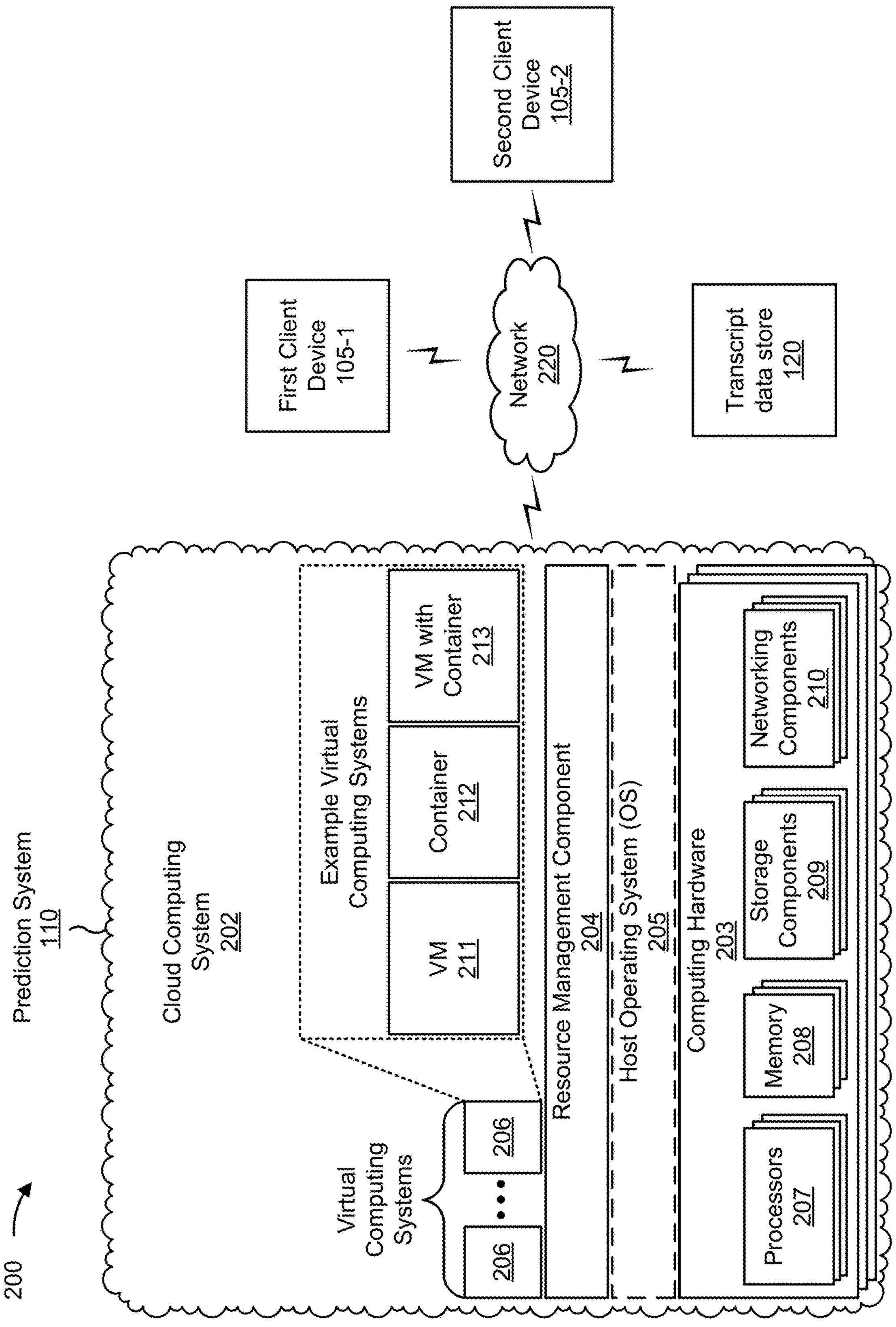
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include prediction system 110, which may include one or more elements of and/or may execute within a cloud computing system 202. The cloud computing system 202 may include one or more elements 203-213, as described in more detail below. As further shown in FIG. 2, environment 200 may include first client device 105-1, second client device 105-2, and transcript data store 120. First client device 105-1, second client device 105-2, and transcript data store 120 have been described above in connection with FIG. 1.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although prediction system 110 may include one or more elements 203-213 of the cloud computing system 202, may execute within the cloud computing system 202, and/or may be hosted within the cloud computing system 202, in some implementations, prediction system 110 may not be cloud-based (e.g., may be implemented outside of a cloud computing system) or may be partially cloud-based. For example, prediction system 110 may include one or more devices that are not part of the cloud computing system 202, such as device 300 of FIG. 3, which may include a standalone server or another type of computing device. Prediction system 110 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
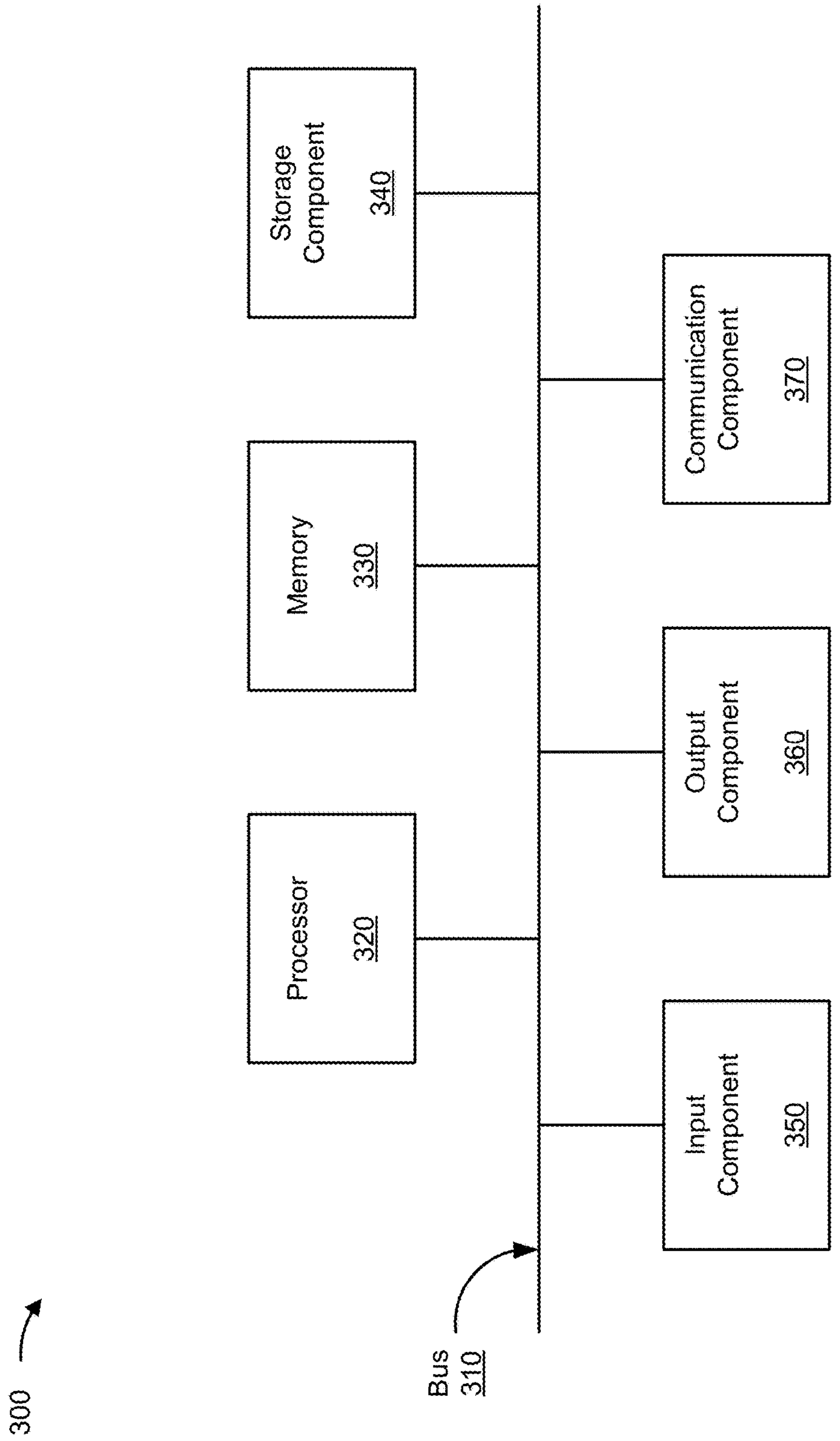
FIG. 3 is a diagram of example components of one or more devices of FIG. 1.

FIG. 3 is a diagram of example components of a device 300, which may correspond to a first client device 105-1, second client device 105-2, prediction system 110, and transcript data store 120. In some implementations, first client device 105-1, second client device 105-2, prediction system 110, and transcript data store 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
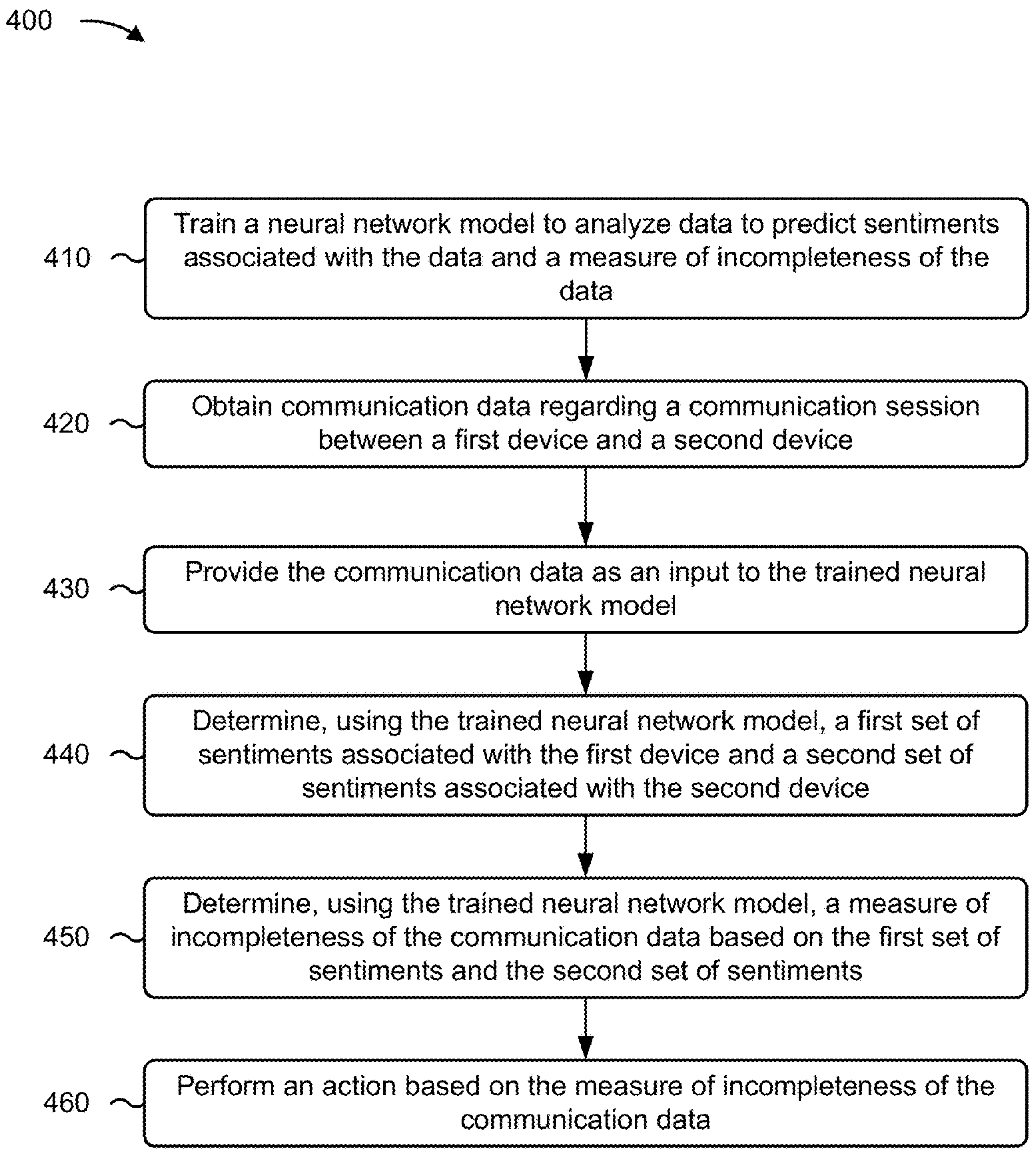
FIG. 4 is a flowchart of an example process relating to predicting data incompleteness using a neural network model.

FIG. 4 is a flowchart of an example process 400 relating to predicting missing data using a neural network model. In some implementations, one or more process blocks of FIG. 3 may be performed by a prediction system (e.g., prediction system 110). In some implementations, one or more process blocks of FIG. 4 may be performed by another device or a group of devices separate from or including the computing system, such as a client device (e.g., first client device 105-1 and/or second client device 105-2). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include training a neural network model to analyze data to predict sentiments associated with the data and a measure of incompleteness of the data (block 410). For example, the prediction system may train a neural network model to analyze data to predict sentiments associated with the data and a measure of incompleteness of the data, as described above.

As further shown in FIG. 4, process 400 may include obtaining communication data regarding a communication session between a first device and a second device, wherein the communication data is obtained via a network (block 420). For example, the prediction system may obtain communication data regarding a communication session between a first device and a second device, wherein the communication data is obtained via a network, as described above. In some implementations, the communication data is obtained via a network.

As further shown in FIG. 4, process 400 may include providing the communication data as an input to the trained neural network model (block 430). For example, the prediction system may provide the communication data as an input to the trained neural network model, as described above.

As further shown in FIG. 4, process 400 may include determining, using the trained neural network model, a first set of sentiments associated with the first device and a second set of sentiments associated with the second device (block 440). For example, the prediction system may determine, using the trained neural network model, a first set of sentiments associated with the first device and a second set of sentiments associated with the second device, as described above.

As further shown in FIG. 4, process 400 may include determining, using the trained neural network model, a measure of incompleteness of the communication data based on the first set of sentiments and the second set of sentiments (block 450). For example, the prediction system may determine, using the trained neural network model, a measure of incompleteness of the communication data based on the first set of sentiments and the second set of sentiments, as described above.

As further shown in FIG. 4, process 400 may include performing an action based on the measure of incompleteness of the communication data (block 460). For example, the prediction system may perform an action based on the measure of incompleteness of the communication data, as described above.

Process 400 may include additional implementations, such as any single implementation or any combination of implementations described below and/or in connection with one or more other processes described elsewhere herein.

In some implementations, training the neural network model comprises obtaining training data, identifying one or more categories of data of the training data, identifying a dictionary for each category of the one or more categories, determining whether each identified dictionary includes a complete dataset, and determining a measure of incompleteness of each dataset of each identified dictionary.

In some implementations, process 400 includes determining one or more matches between the first set of sentiments and the second set of sentiments, wherein the measure of incompleteness of the communication data comprises determining the measure of incompleteness of the communication data based on the one or more matches.

In some implementations, the communication data includes textual data and graphical data, and wherein determining the first set of sentiments and the second set of sentiments comprises performing a sentiment analysis using the textual data, and determining one or more sentiments associated with the graphical data.

In some implementations, the trained neural network model includes at least one of a recurrent neural network model or a natural language processing model.

In some implementations, the communication data includes textual data and a plurality of data classification identifiers, wherein determining the first set of sentiments and the second set of sentiments comprises performing a sentiment analysis using the textual data to determine the first set of sentiments and the second set of sentiments, and wherein determining the measure of incompleteness comprises determining one or more matches between the first set of sentiments and the plurality of data classification identifiers, and determining the measure of incompleteness based on determining the one or more matches.

In some implementations, performing the action comprises providing a notification regarding the measure of incompleteness of the communication data to one or more of the first device or the second device.

In some implementations, determining the first set of sentiments and the second set of sentiments comprises parsing the communication data to identify one or more phrases; and performing a sentiment analysis using the one or more phrases.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method performed by a prediction system, the method comprising:

training a neural network model to analyze data to predict sentiments associated with the data and a measure of incompleteness of the data;

obtaining communication data regarding a communication session between a first device and a second device, wherein the communication data is obtained via a network;

providing the communication data as an input to the trained neural network model;

determining, using the trained neural network model, a first set of sentiments associated with the first device and a second set of sentiments associated with the second device, wherein the first set of sentiments and the second set of sentiments are determined based on the communication data;

determining one or more matches between the first set of sentiments and the second set of sentiments;

determining, using the trained neural network model, a measure of incompleteness of the communication data based on the one or more matches between the first set of sentiments and the second set of sentiments; and performing an action based on the measure of incompleteness of the communication data.

2. The method of claim 1, wherein training the neural network model comprises:

obtaining training data;

identifying one or more categories of data of the training data;

identifying a dictionary for each category of the one or more categories;

determining whether each identified dictionary includes a complete dataset; and determining a measure of incompleteness of each dataset of each identified dictionary.

3. The method of claim 1, wherein the communication data includes textual data and graphical data, and wherein determining the first set of sentiments and the second set of sentiments comprises:

performing a sentiment analysis using the textual data; and determining one or more sentiments associated with the graphical data.

4. The method of claim 1, wherein the trained neural network model includes at least one of a recurrent neural network model or a natural language processing model.

5. The method of claim 1, wherein the communication data includes textual data and a plurality of data classification identifiers, wherein determining the first set of sentiments and the second set of sentiments comprises:

performing a sentiment analysis using the textual data to determine the first set of sentiments and the second set of sentiments, and wherein determining the measure of incompleteness comprises:

determining one or more matches between the first set of sentiments and the plurality of data classification identifiers, and determining the measure of incompleteness based on determining the one or more matches.

6. The method of claim 1, wherein performing the action comprises:

providing a notification regarding the measure of incompleteness of the communication data to one or more of the first device or the second device.

7. A device, comprising:

one or more memories; and one or more processors, coupled to the one or more memories, configured to:

train a machine learning model to analyze data to predict sentiments associated with the data and a measure of incompleteness of the data;

obtain communication data generated during a communication session between a first device and a second device, wherein the communication data is obtained via a network;

provide the communication data as an input to the trained machine learning model;

determine, using the trained machine learning model, a first set of sentiments associated with the first device and a second set of sentiments associated with the second device;

determine one or more matches between the first set of sentiments and the second set of sentiments;

determine, using the trained machine learning model, a measure of incompleteness of the communication data based on the one or more matches between the first set of sentiments and the second set of sentiments; and perform an action based on the measure of incompleteness of the communication data.

8. The device of claim 7, wherein the one or more processors, to train the machine learning model, are configured to:

obtain training data;

identify one or more categories of data of the training data;

identify a dictionary for each category of the one or more categories;

determine whether each identified dictionary includes a complete dataset; and determine a measure of incompleteness of each dataset of each identified dictionary.

9. The device of claim 7, wherein the communication data includes text and emojis, and wherein the one or more processors, to determine the first set of sentiments and the second set of sentiments, are configured to:

perform a sentiment analysis using the text; and determine one or more sentiments associated with the emojis.

10. The device of claim 7, wherein the trained machine learning model includes at least one of a recurrent neural network model or a natural language processing model.

11. The device of claim 7, wherein the communication data includes textual data and a plurality of data classification identifiers, wherein the one or more processors, to determine the first set of sentiments and the second set of sentiments, are configured to:

perform a sentiment analysis using the textual data to determine the first set of sentiments and the second set of sentiments, and wherein the one or more processors, to determine the measure of incompleteness, are configured to:

determine one or more matches between the first set of sentiments and the plurality of data classification identifiers, and determine the measure of incompleteness based on determining the one or more matches.

12. The device of claim 7, wherein the one or more processors, to perform the action, are configured to:

predicting values for missing data from the communication data; and provide information regarding the values to one or more of the first device or the second device.

13. The device of claim 7, wherein the one or more processors, to determine the first set of sentiments and the second set of sentiments, are configured to:

determining the first set of sentiments and the second set of sentiments using a natural language processing model.

14. The device of claim 7, wherein the one or more processors, to perform the action, are configured to:

provide a notification regarding the measure of incompleteness of the communication data to one or more of the first device or the second device.

15. A non-transitory computer-readable medium storing a set of instructions, the set of instructions comprising:

one or more instructions that, when executed by one or more processors of a prediction system, cause the prediction system to:

train a machine learning model to analyze data to predict sentiments associated with the data and a measure of incompleteness of the data;

obtain communication data generated during a communication session between a first device and a second device, wherein the communication data is obtained via a network;

provide the communication data as an input to the trained machine learning model;

determine, using the trained machine learning model, a first set of sentiments associated with the first device and a second set of sentiments associated with the second device;

determine one or more matches between the first set of sentiments and the second set of sentiments;

determine, using the trained machine learning model, a measure of incompleteness of the communication data based on the one or more matches between the first set of sentiments and the second set of sentiments; and perform an action based on the measure of incompleteness of the communication data.

16. The non-transitory computer-readable medium of claim 15, wherein the one or more instructions, that cause the prediction system to train the machine learning model, cause the prediction system to:

obtain training data;

identify one or more categories of data of the training data;

identify a dictionary for each category of the one or more categories;

determine whether each identified dictionary includes a complete dataset; and determine a measure of incompleteness of each dataset of each identified dictionary.

17. The non-transitory computer-readable medium of claim 15, wherein the communication data includes textual data and graphical data, and wherein the one or more instructions, that cause the prediction system to determine the first set of sentiments and the second set of sentiments, cause the prediction system to:

perform a sentiment analysis using the textual data; and determine one or more sentiments associated with the graphical data.

18. The non-transitory computer-readable medium of claim 15, wherein the one or more instructions, that cause the prediction system to determine the first set of sentiments and the second set of sentiments, cause the prediction system to:

parse the communication data to identify one or more phrases; and perform a sentiment analysis using the one or more phrases.

19. The non-transitory computer-readable medium of claim 15, wherein the one or more instructions, that cause the prediction system to perform the action, cause the prediction system to:

provide a notification regarding the measure of incompleteness of the communication data to one or more of the first device or the second device.

20. The non-transitory computer-readable medium of claim 15, wherein the machine learning model includes a neural network model.

* * * * *